(12) United States Patent
Zhang et al.

(10) Patent No.: US 10,125,927 B2
(45) Date of Patent: Nov. 13, 2018

(54) LIGHT-EMITTING DEVICE AND STAGE LAMP SYSTEM

(71) Applicant: APPOTRONICS CHINA CORPORATION, Shenzhen (CN)

(72) Inventors: Quan Zhang, Shenzhen (CN); Fei Hu, Shenzhen (CN)

( * ) Notice: Subject to any disclaimer, the term of this patent is extended or adjusted under 35 U.S.C. 154(b) by 104 days.

(21) Appl. No.: 14/891,661

(22) PCT Filed: May 7, 2014

(86) PCT No.: PCT/CN2014/076955
§ 371 (c)(1),
(2) Date: Nov. 16, 2015

(87) PCT Pub. No.: WO2014/183583
PCT Pub. Date: Nov. 20, 2014

(65) Prior Publication Data
US 2016/0131315 A1 May 12, 2016

(30) Foreign Application Priority Data

May 17, 2013 (CN) ...................... 2013 2 0274485 U

(51) Int. Cl.
*F21V 9/00* (2018.01)
*F21K 99/00* (2016.01)
(Continued)

(52) U.S. Cl.
CPC ................. *F21K 9/58* (2013.01); *F21K 9/65* (2016.08); *F21S 8/00* (2013.01); *F21V 9/08* (2013.01);
(Continued)

(58) Field of Classification Search
CPC ...... F21K 9/58; F21K 9/65; F21S 8/00; F21V 9/08; F21V 9/10; F21W 2131/406;
(Continued)

(56) References Cited

U.S. PATENT DOCUMENTS 6,769,772 B2 * 8/2004 Roddy .................. G03B 21/00
353/31
6,882,379 B1 * 4/2005 Yokoyama ......... G02B 27/1033
349/5
(Continued)

FOREIGN PATENT DOCUMENTS

CN 101392891 A 3/2009
CN 101968170 A 2/2011
(Continued)

OTHER PUBLICATIONS

International Search Report in the parent PCT application No. PCT/CN2014/076955, dated Aug. 6, 2014.
(Continued)

*Primary Examiner* — Tsion Tumebo
(74) *Attorney, Agent, or Firm* — Chen Yoshimura LLP

(57) ABSTRACT

A light emitting device includes first, second and third LED arrays and a wavelength-based light combination device. The first LED array includes blue LEDs; the second LED array includes yellow fluorescent LEDs or green fluorescent LEDs and green LEDs; the third LED array includes red LEDs and amber LEDs. The light combination device includes first and second filters. The first filter reflects wavelengths below or equal to $\lambda_1$ and transmits other wavelengths; the second filter transmits wavelengths below or equal to $\lambda_2$ and reflects other wavelengths, where 470 nm$\leq\lambda_1\leq$500 nm, 560 nm$\leq\lambda_2\leq$590 nm. The first and second filters combine the lights from the first, second and third LED arrays into one beam. The light emitting device can emit a white light with high color rendering index. Also disclosed is a stage lighting system employing the light emitting device.

15 Claims, 6 Drawing Sheets

(51) Int. Cl.
*G02B 27/10* (2006.01)
*G02B 27/12* (2006.01)
*F21S 8/00* (2006.01)
*F21V 9/10* (2006.01)
*F21V 9/08* (2018.01)
*G02B 27/14* (2006.01)
*F21K 9/65* (2016.01)
*F21W 131/406* (2006.01)
*F21Y 115/10* (2016.01)
*F21Y 113/13* (2016.01)

(52) U.S. Cl.
CPC .............. *F21V 9/10* (2013.01); *G02B 27/102* (2013.01); *G02B 27/1006* (2013.01); *G02B 27/126* (2013.01); *G02B 27/145* (2013.01); *G02B 27/149* (2013.01); *F21W 2131/406* (2013.01); *F21Y 2113/13* (2016.08); *F21Y 2115/10* (2016.08)

(58) Field of Classification Search
CPC .............. F21Y 2113/13; F21Y 2115/10; G02B 27/1006; G02B 27/102; G02B 27/126; G02B 27/145; G02B 27/149
USPC ......................................................... 362/231
See application file for complete search history.

(56) References Cited

U.S. PATENT DOCUMENTS

| | | | | |
|---|---|---|---|---|
| 6,916,097 | B2* | 7/2005 | Omoda .............. | G03B 21/2013 345/44 |
| 6,918,682 | B2* | 7/2005 | Kim ..................... | G02B 27/102 348/E9.027 |
| 7,070,281 | B2* | 7/2006 | Kato ...................... | H04N 9/315 348/E9.027 |
| 7,192,147 | B2* | 3/2007 | Sakata ..................... | H04N 5/74 348/E5.137 |
| 7,270,425 | B2* | 9/2007 | Arai .................... | G02B 27/0961 348/E9.027 |
| 7,287,860 | B2* | 10/2007 | Yoshida ................. | H04N 9/315 348/E9.027 |
| 7,303,291 | B2* | 12/2007 | Ikeda .................... | G02B 3/0056 348/E9.027 |
| 7,325,956 | B2* | 2/2008 | Morejon ............ | G02B 27/1006 348/E9.027 |
| 7,410,264 | B2* | 8/2008 | Yamasaki .......... | G02B 27/0911 348/801 |
| 7,434,945 | B2* | 10/2008 | Maeda ................... | H04N 9/315 348/743 |
| 7,575,340 | B2* | 8/2009 | Kung .................. | G02B 27/102 362/231 |
| 7,717,566 | B2* | 5/2010 | Miyazaki ........... | G03B 21/2033 349/8 |
| 8,313,198 | B2* | 11/2012 | Kamijima ............ | G03B 21/208 345/32 |
| 8,662,690 | B2* | 3/2014 | Li ........................ | G03B 21/204 362/231 |
| 2004/0218387 | A1* | 11/2004 | Gerlach ................... | F21K 9/00 362/231 |
| 2005/0200812 | A1* | 9/2005 | Sakata .................. | H04N 9/315 353/20 |
| 2005/0219464 | A1* | 10/2005 | Yamasaki .......... | G03B 21/2073 353/20 |
| 2006/0050245 | A1* | 3/2006 | Arai .................... | G02B 27/0961 353/85 |
| 2006/0132725 | A1* | 6/2006 | Terada ................. | G02B 27/102 353/102 |
| 2008/0143970 | A1 | 6/2008 | Harbers et al. | |
| 2012/0147333 | A1* | 6/2012 | Jorgensen ............. | G03B 33/06 353/31 |
| 2012/0147601 | A1* | 6/2012 | Li ........................ | G03B 21/204 362/231 |
| 2012/0212955 | A1* | 8/2012 | Salm .................. | H05B 33/0857 362/231 |
| 2013/0100639 | A1 | 4/2013 | Li et al. | |
| 2013/0242543 | A1 | 9/2013 | Do et al. | |
| 2015/0023012 | A1 | 1/2015 | Yang et al. | |

FOREIGN PATENT DOCUMENTS

| | | |
|---|---|---|
| CN | 202710914 U | 1/2013 |
| CN | 203258507 U | 10/2013 |
| EP | 2770363 A1 | 8/2014 |
| WO | 2008/072195 A1 | 6/2008 |
| WO | 2012026718 A2 | 3/2012 |
| WO | 2013/056594 A1 | 4/2013 |

OTHER PUBLICATIONS

IPRP in the parent PCT application No. PCT/CN2014/076955, dated Nov. 17, 2015.
Extended European Search Report dated Jun. 15, 2016, in a counterpart EP application, No. EP 14797412.5.

* cited by examiner

LIGHT-EMITTING DEVICE AND STAGE LAMP SYSTEM

BACKGROUND OF THE INVENTION

Field of the Invention

This invention relates to illumination and display technologies, and in particular, it relates to a light emitting device and a stage lighting system.

Description of Related Art

With the advance of semiconductor technologies and energy shortage around the world, and global warming issues, semiconductor LED (light emitting diode) light sources, due to their advantages in energy efficiency, environmental friendliness, controllable brightness and color temperature, etc., are gaining wide use in various fields and are replacing conventional light sources. In the near future, with the cost reduction and improvement in efficiency of LEDs, semiconductor LED light sources will replace conventional light sources in all fields.

FIG. 1 is a LED based light emitting device of current technology. As shown in FIG. 1, the light emitting device includes a red LED array 110, a green LED array 120 and a blue LED array 130. The lights emitted by these three LED arrays are respectively collimated by a first collimating lens array 140, a second collimating lens array 150 and a third collimating lens array 160 to incident on the X-shaped filter plates 170, and are combined by the X-shaped filter plates 170 into one light beam for output. A fly-eye lens pair 180 homogenizes the light outputted by the X-shaped filter plates 170, and the homogenized light is projected by the lens 190 to a target region.

In this light emitting device, the light emitting device consist of red, green and blue LED arrays, and the color control of the combined light is realized by controlling the drive currents of the red, green and blue primary color LEDs. Because the three primary color LEDs emit lights directly, the saturation of the monochromatic lights is very high; they can be used as light sources for stage lighting, and can meet the requirement for vivid colors for stages. However, because the number of primary colors is few, the spectrum of the combined white light is not continuous, so the color rendering index of the light emitting device is relatively low. In particular, for application environments such as a broadcasting room or for photography where the white light is required to have a color rendering index over 85, current light emitting devices cannot meet the color rendering index requirement.

SUMMARY

Embodiments of the present invention solve the technical problems by providing a light emitting device and stage lighting system that emit white light with a high color rendering index.

An embodiment of the present invention provides a light emitting device, which includes:

A first LED array, including blue LEDs, for emitting a first light;

A second LED array, including green LEDs and yellow phosphor LEDs, or green LEDs and green phosphor LEDs, for emitting a second light, wherein at least a part of the second light is incident in a wavelength-based light combination device;

A third LED array, including at least one of red LEDs and red phosphor LEDs, and at least one of amber LEDs and amber phosphor LEDs, for emitting a third light;

A wavelength-based light combination device, which includes a first filter plate and a second filter plate, wherein the first filter plate has an optical property that reflects light with wavelengths below or equal to $\lambda_1$ and transmits light with wavelengths above $\lambda_1$, the second filter plate has an optical property that transmits light with wavelengths below or equal to $\lambda_2$ and reflects light with wavelengths above $\lambda_2$, where 470 nm$\leq\lambda_1\leq$500 nm and 560 nm$\leq\lambda_2\leq$590 nm;

Wherein the first filter plate receives the first light and the second light which are incident on its different sides, and outputs the reflected part of the first light and the transmitted part of the second light along a first direction; the second filter plate receives the second light and the third light which are incident on its different sides, and outputs the transmitted part of the second light and the reflected part of the third light along the first direction, where the first direction is along the direction of the optical axis of the second LED array.

Preferably, all of the second light is incident onto the wavelength-based light combination device.

Preferably, the second LED array includes a first array unit and a second array unit, where the LEDs in the second array unit are located outside of the first array unit, and all of the light emitted by the first array unit is incident onto the wavelength-based light combination device, and the light emitted by the second array unit passes around the outside of the wavelength-based light combination device and is output in the same direction as the output light of the wavelength-based light combination device.

Preferably, the second array unit includes yellow phosphor LEDs.

Preferably, the first LED array further includes deep blue LEDs; and/or, the second LED array further includes cyan LEDs and/or cyan phosphor LEDs; and/or, the third LED array further includes orange LEDs and/or orange phosphor LEDs.

Preferably, the wavelength-based light combination device is X-shaped filter plates, and the light emitting device further includes a first reflecting plate and second reflecting plate disposed respectively on two sides of the wavelength-based light combination device, wherein the first reflecting plate and the second reflecting plate are parallel to a plane defined by the optical axes of the first LED array, the second LED array and the third LED array, for reflecting lights incident on the first and second reflecting plates.

Preferably, at least one of the LED arrays includes LEDs of more than two colors, and within the same LED array, the number of one color LEDs is no greater than three times the number of another color LEDs.

Preferably, the LED array includes LEDs of more than two colors, and within the same LED array, the different color LEDs are uniformly distributed in the LED array.

Preferably, the cutoff wavelength $\lambda_1$ of the first filter plate is 490 nm, and the cutoff wavelength $\lambda_2$ of the second filter plate is 580 nm.

Preferably, the first LED array is formed of deep blue LEDs and blue LEDs; the second LED array is formed of cyan LEDs, green LEDs, and yellow phosphor LEDs, or formed of cyan LEDs, green LEDs, and green phosphor LEDs; and the third LED array is formed of orange LEDs, red LEDs, and amber LEDs.

Preferably, the luminous flux ratio of the blue LEDs and deep blue LEDs in the first LED array is 1:1; the luminous flux ratio of the yellow phosphor LEDs, the green LEDs and the cyan LEDs, or the luminous flux ratio of the green phosphor LEDs, the green LEDs and the cyan LEDs in the second LED array is 2:1:1; the luminous flux ratio of the red LEDs, the orange LEDs and the amber LEDs in the third LED array is 1:1:2.

Another embodiment of the present invention provides a stage lighting system, which includes the above light emitting devices.

Compared to conventional technologies, embodiments of the present invention have the following advantages:

In embodiments of the present invention, the light emitting device includes the first LED array, the second LED array and the third LED array, the first LED array including blue LEDs, the second LED array including yellow phosphor LED or green phosphor LED, and the third LED array including at least one of red LEDs and red phosphor LEDs and at least one of amber LEDs and amber phosphor LEDs, so the combined light of the three LED arrays can cover a wider spectrum. The presence of the light combination device allows most of the light of the three LED arrays to be combined into one light beam for output. Further, when the cutoff wavelengths of the first and second filter plates are respectively from 470 nm to 500 nm and from 560 nm to 590 nm, light combination using the wavelength-based light combination device will not cause significant loss of the combined light, and the white light combined by the light emitting device can have a color rendering index of over 85.

DETAILED DESCRIPTION OF PREFERRED EMBODIMENTS

Embodiments of the present invention are described in detail below with reference to the drawings.

Figure 1:
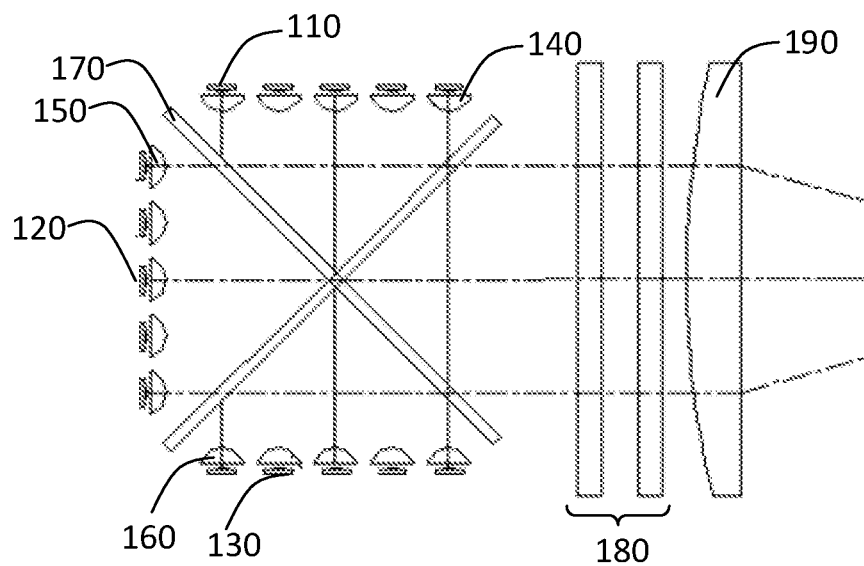
FIG. 1 illustrates a conventional LED-based light emitting device.
Figure 2:
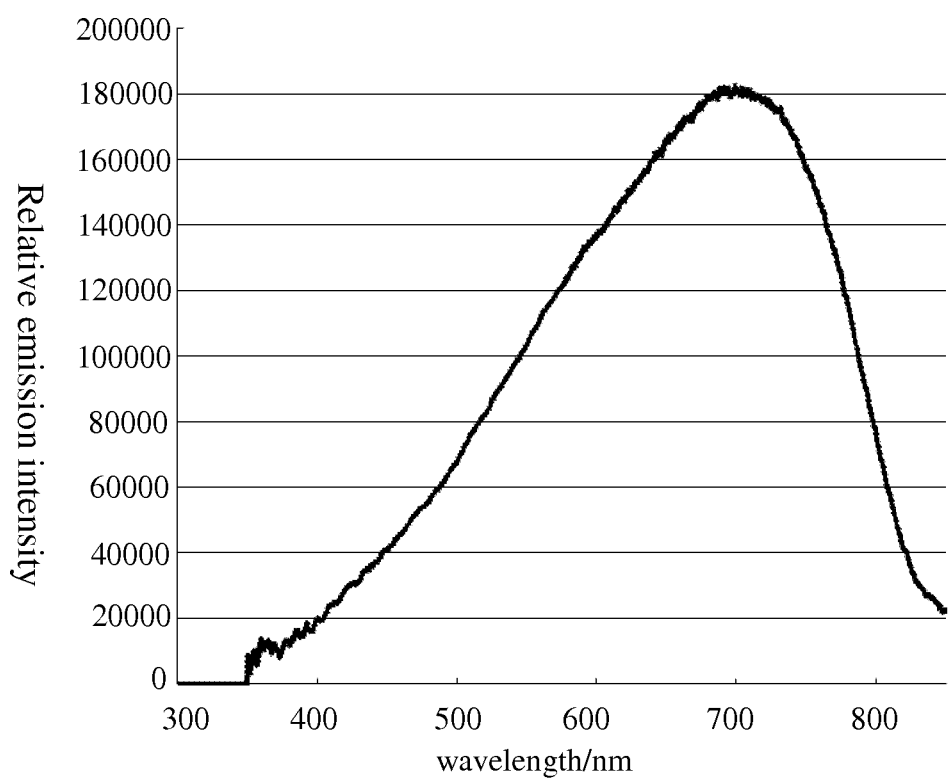
FIG. 2 illustrates the blackbody radiation curve of an incandescent lamp having a color temperature of 3200K.

In the conventional technology shown in FIG. 1, because the light emitting device only uses three primary colors of red, blue and green, the spectrum range of the combined light is small, and the color rendering index of the combined white light is low, typically below 50. Color rendering index is based on incandescent lamps as an ideal light source, and the color rendering index of an incandescent lamp is defined as 100. The spectrum of incandescent lamp is continuous within the visible range. The closer the spectrum of the output light of a light emitting source is to the spectrum of an incandescent lamp, the higher its color rendering index. Thus, to increase the color rendering index of the light emitting device of FIG. 1, its spectrum range needs to be broadened so that it is closer to the blackbody radiation curve of the incandescent lamp. For example, FIG. 2 illustrates the blackbody radiation curve of an incandescent lamp having a color temperature of 3200K. The color rendering index of this incandescent lamp is approximately 100.

One obvious solution is to provide multiple color LEDs in the LED array to broaden the spectrum of the combined light. However, using multiple color LEDs in an LED array will increase the size of the LED array; when used in a stage lighting system or other applications, the downstream pattern plate also needs to be large, so the overall size of the light emitting device is large.

First Embodiment

Figure 3:
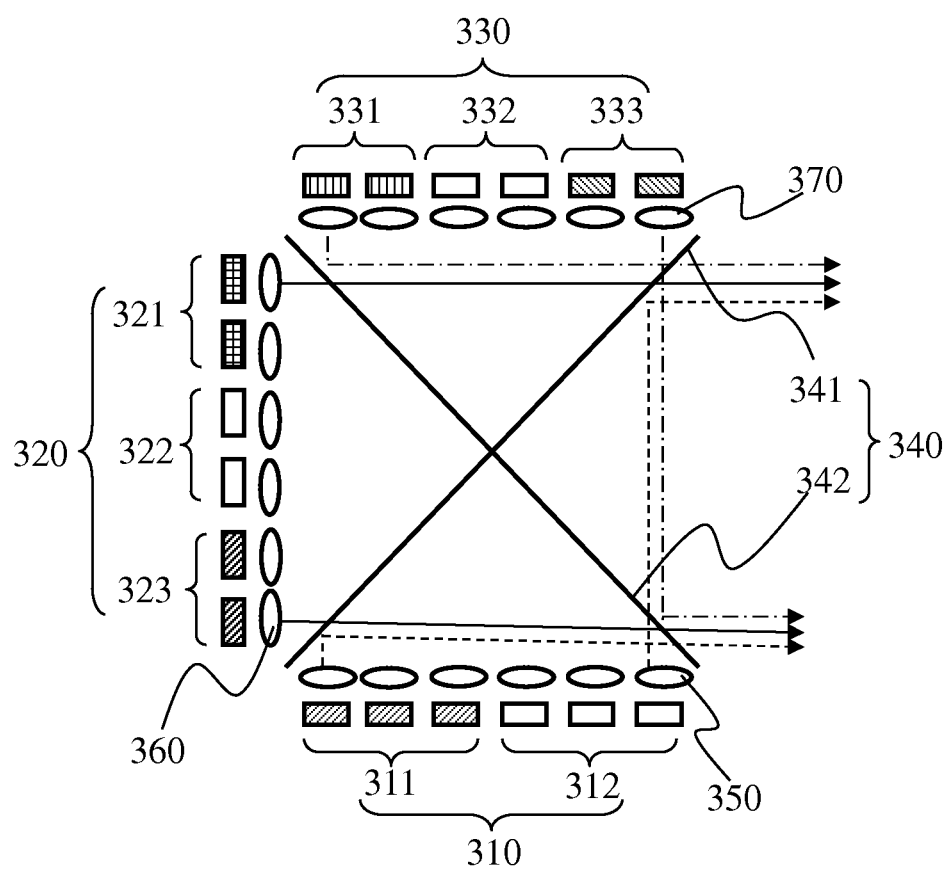
FIG. 3 schematically illustrates a light emitting device according to an embodiment of the present invention.

To reduce the size, this embodiment uses three LED arrays and a wavelength-based light combination device to combine the output light of the LED arrays. FIG. 3 schematically illustrates a light emitting device according to this embodiment of the present invention. As shown in FIG. 3, to make the spectrum range covered by the output spectrum of the light emitting device closer to the spectrum range of the incandescent lamp, the light emitting device includes blue LEDs 311, deep blue LEDs 312, yellow phosphor LEDs 321, green LEDs 322, cyan LEDs 323, red LEDs 331, amber LEDs 332, and orange LEDs 333. The dominant wavelength of the red LEDs is between 720 nm and 770 nm; the dominant wavelength of the amber LEDs is between 580 nm and 600 nm; the dominant wavelength of the orange LEDs is between 710 nm and 720 nm; the dominant wavelength of the green LEDs is between 520 nm and 550 nm; the dominant wavelength of the cyan LEDs is between 490 nm and 520 nm; the dominant wavelength of the blue LEDs is between 460 nm and 490 nm; and the dominant wavelength of the deep blue LEDs is between 440 nm and 460 nm. The yellow phosphor LEDs are LEDs coated with a yellow phosphor material; its dominant wavelength is between 540 nm and 570 nm, and its spectrum is broader than the spectrum of yellow LEDs.

For ease of light combination, the LEDs of similar colors are arranged in the same LED array. Because the blue light component is relatively small in a white light, the required numbers of blue LEDs and deep blue LEDs are correspondingly relatively small, one might be tempted to place similarly colored cyan LEDs, blue LEDs and deep blue LEDs in the same LED array to fill the area of the LED circuit. However, it was discovered through experimentation that in downstream light combination for the three LED arrays, light loss is large; this is because the peaks of the cyan LED spectrum and the green LED spectrum are too close to each other, and a large portion of the light is filtered out by the filter plates. Therefore, the first LED array 310 includes blue LEDs 311 and deep blue LEDs 312, for outputting a first light; the second LED array 320 includes yellow phosphor LEDs 321, green LEDs 322, and cyan LEDs 323, for outputting a second light; the third LED array 330 includes red LEDs 331, amber LEDs 332, and orange LEDs 333, for outputting a third light. It was confirmed through experimentation that the LED distribution in the three LED arrays according to this embodiment can minimize light loss.

The light emitted by LEDs has a Lambertian distribution. During propagation, the cross-sectional size of the light outputted by the LEDs will increase due to divergence. This can cause light loss when the light is incident on downstream optical components. Therefore, the light emitting device further includes a first collimating lens array 350, a second collimating lens array 360, and a third collimating lens array 370. The first collimating lens array 350, the second collimating lens array 360 and the third collimating lens array 370 respectively correspond to the first LED array 310, the second LED array 320 and the third LED array 330 to collimate the light they emit. Of course, in applications which have relatively low requirement for light utilization efficiency or in some other special applications, the first collimating lens array 350, the second collimating lens array 360 and the third collimating lens array 370 may be omitted from the light emitting device.

The wavelength-based light combination device 340 is X-shaped filter plates, including a first filter plate 341 and a second filter plate 342. For the convenience of the filter plate design, as shown in FIG. 3, the first LED array 310, the second LED array 320 and the third LED array 330 surround the wavelength-based light combination device 340; the first LED array 310 and the third LED array 330 are respectively disposed on two opposite sides of the wavelength-based light combination device 340, and the second LED array is disposed on a plane that is perpendicular to both the first LED array and the third LED array. The first light emitted by the first LED array 310, the second light emitted by the second LED array 320 and the third light emitted by the third LED array 330 are all incident on the wavelength-based light combination device 340. Here, the first filter plate 341 and the second filter plate 342 are high-pass filter plates or low-pass filter plates; these are easier to design than band-pass filter plates, and can also reduce light loss.

Figure 4:
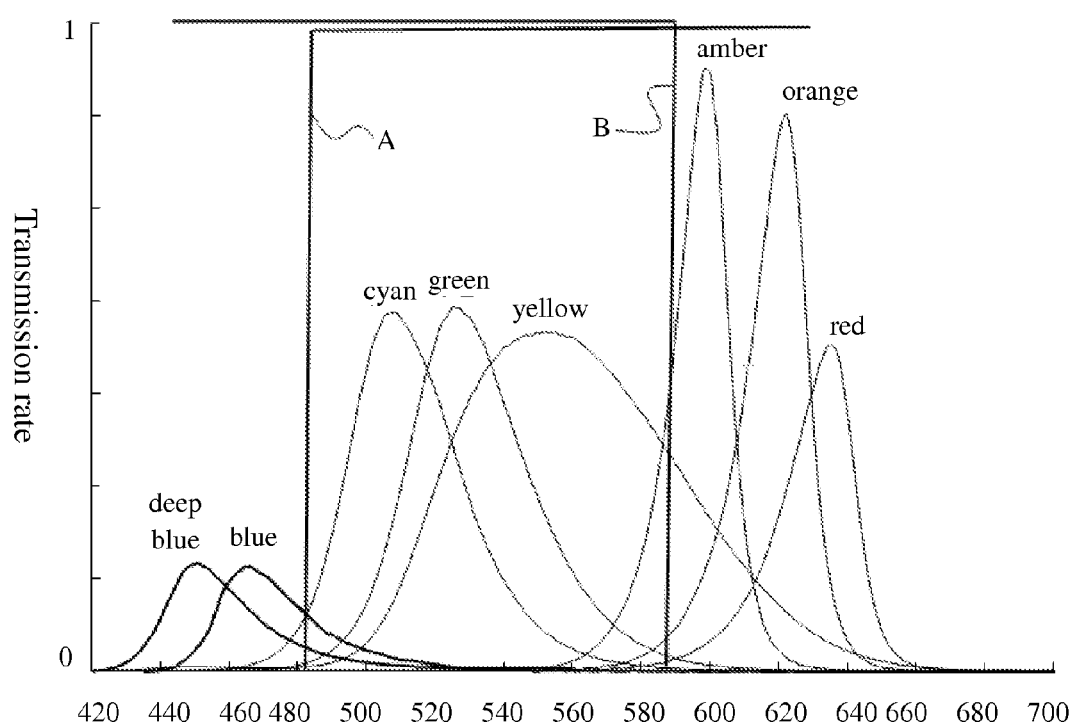
FIG. 4 illustrates all spectra of the lights outputted by the LEDs of the light emitting device of FIG. 3.

FIG. 4 illustrates all spectra of the lights outputted by the LEDs of the light emitting device of FIG. 3. As shown in FIG. 4, adjacent spectral curves have overlap. Based on the arrangements of the various color LEDs in the LED arrays, to combine most of the first, second and third light to the same optical path, as shown in FIG. 4, the first filter plate is a high-pass filter which has an optical property that reflects light with wavelengths below or equal to $\lambda_1$ and transmit light with wavelengths above $\lambda_1$, and its transmission curve is curve A; the second filter plate is a low-pass filter which has an optical property that transmits light with wavelengths below or equal to $\lambda_2$ and reflects light with wavelengths above $\lambda_2$, and its transmission curve is curve B.

From FIG. 4, it can be seen that any values of cutoff wavelengths of the first filter plate 341 and second filter plate 342 will divide the output spectrum of at least one color LEDs into two parts. Thus, light loss is unavoidable when combining the output lights of the three LED arrays using the wavelength-based light combination device 340. Therefore, different choices of the cutoff wavelengths $\lambda_1$ and $\lambda_2$ can change the spectrum of the combined light outputted by the wavelength-based light combination device 340.

Figure 5:
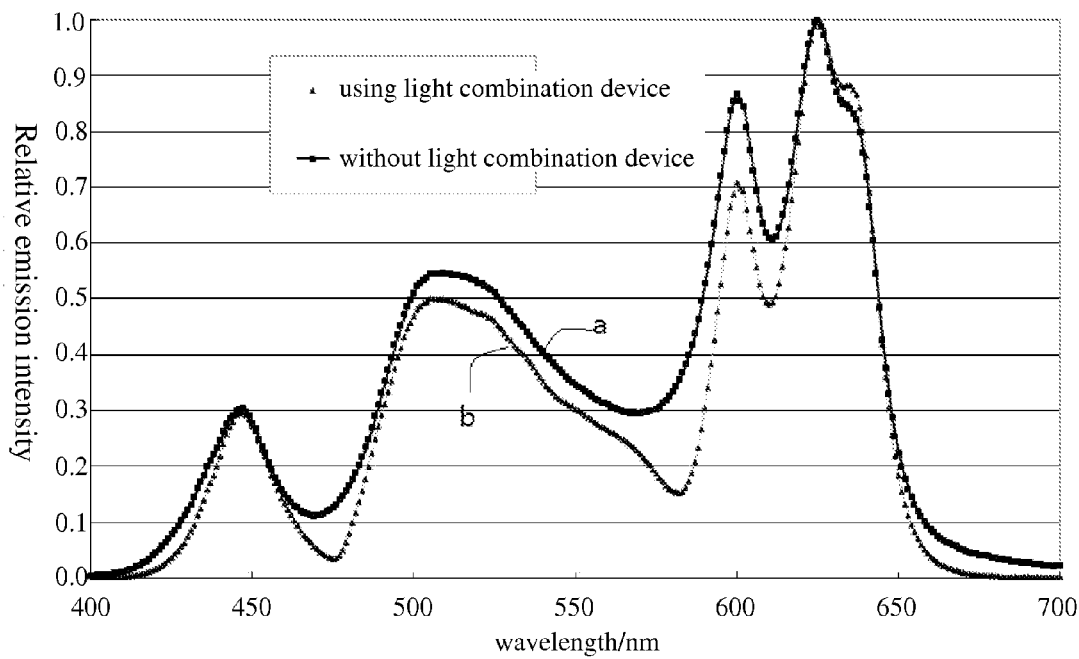
FIG. 5 illustrates the spectrum of the output light of the wavelength-based light combination device of the light emitting device of FIG. 3.

To reduce light loss, it was discovered through experimentation that the cutoff wavelength $\lambda_1$ should be located near the crossing point of the spectral curve of the blue LED and that of the cyan LED, and the cutoff wavelength $\lambda_2$ should be located near the crossing point of the spectral curve of the yellow phosphor LED and that of the amber LED. The farther away the cutoff wavelengths are from the above crossing points, the higher the light loss. To make the cutoff wavelengths $\lambda_1$ and $\lambda_2$ located near these two crossing points, the ranges of the cutoff wavelengths $\lambda_1$ and $\lambda_2$ are 470 nm$\leq\lambda_1\leq$500 nm and 560 nm$\leq\lambda_2\leq$590 nm. This way, the light loss of the output light after the wavelength-based light combination device 340 is relatively small, and it is also easier to adjust the combined light outputted by the wavelength-based light combination device 340 to a white light of high color rendering index. Preferably, the cutoff wavelength $\lambda_1$ is 490 nm and the wavelength $\lambda_2$ is 580 nm. In this situation, the spectrum of the output light of the wavelength-based light combination device of the light emitting device of FIG. 3 is illustrated in FIG. 5, which shows the output spectrum of the wavelength-based light combination device 340. The curve a is the output spectrum when the output lights of the first LED array 310, the second LED array 320 and the third LED array 330 are directly combined without using the wavelength-based light combination device 340, and curve b is the output spectrum when the lights are combined by the wavelength-based light combination device 340. Comparing the two, it can be seen that relative to curve a, the spectral intensity of curve b has some losses near $\lambda_1$=490 nm and $\lambda_2$=580 nm, but the losses are relatively small.

In this situation, of the first light, the light with wavelengths below or equal to $\lambda_1$ is reflected by the first filter plate 341 and the light with wavelengths above $\lambda_1$ is transmitted by the first filter plate 341, and all light is transmitted by the second filter plate 342; of the second light, all light is transmitted by both the first filter plate 341 and the second filter plate 342; of the third light, the light with wavelengths above $\lambda_2$ is reflected by the second filter plate 342 and the light with wavelengths below $\lambda_2$ is transmitted by the second filter plate 342, and all light is transmitted by the first filter plate 341. Thus, the first filter plate 341 receives the first light and the second light incident from its different sides, and directs the reflected part of the first light and the transmitted part of the second light to be output along the first direction; the third light incident on the first filter plate 341 is transmitted through and does not change its direction. The second filter plate 342 receives the second light and the third light incident from its different sides, and directs the transmitted part of the second light and the reflected part of the third light to be output along the first direction; the first light incident on the second filter plate 342 is transmitted through and does not change its direction. Here, the first direction is the direction of the optical axis of the second LED array. Thus, the wavelength-based light combination device 340 combines the majority of the first, second and third lights and outputs them along the same direction.

When the light emitting device is used in applications such as stage lighting, it is often required to be able to output both monochromatic lights and white light or other mixed color lights. To ensure the brightness of output monochromatic light, the numbers of LEDs of each color in the LED arrays cannot be too small. Therefore, preferably, when an LED array includes two or more color LEDs, the numbers of the different color LEDs in the LED array should have certain ratios: within the same LED array, the luminous flux of one color LEDs is no greater than three times the luminous flux of another color LEDs. For example, in the first LED array 310, the luminous flux ratio of the blue LEDs 311 and the deep blue LEDs 312 is 1/3 to 3. In the second LED array, the luminous flux ratio of the yellow phosphor LEDs 321 and the green LEDs 322 is 1/3 to 3, the luminous flux ratio of the green LEDs 322 and the cyan LEDs 323 is 1/3 to 3, and the luminous flux ratio of the yellow phosphor LEDs and the cyan LEDs is also 1/3 to 3. When the sizes of the different color LEDs are the same, the above luminous flux ratios can be approximated with the corresponding number ratios. Of course, the total numbers of LEDs in the arrays may not exactly meet the above ratios; for example, when the number ratio of blue LEDs and deep blue LEDs is 1:1.2, it can be rounded to approximately 1:1 which meets the above requirements. Of course, when monochromatic light projection is not required, there is no requirement on the luminous flux ratios of the different color LEDs in the same LED arrays.

After the optical properties of the first filter plate 341 and second filter plate 342, the types and numbers of different LEDs in each array are determined, the drive currents of the LEDs may be adjusted to achieve white output light of different color temperatures. For a light emitting device using eight color LEDs, there are many ways to mix the lights to achieve a certain color temperature for the white light; the desired mixing scheme may be chosen based on considerations of color rendering index and brightness.

Take 3200K and 5600K white lights as examples. The cutoff wavelength of the first filter plate 341 is set at 490 nm, and the cutoff wavelength of the second filter plate 342 is set at 580 nm. In the first LED array 310, the number ratio of the blue LEDs (demoted B) and deep blue LEDs (denoted Db) is 1:1; in the second LED array 320, the number ratio of the yellow phosphor LEDs (denoted Y), the green LEDs (denoted G) and the cyan LEDs (denoted C) is 2:1:1; and in the third LED array 330, the number ratio of the red LEDs (denoted R), the orange LEDs (denoted O) and the amber LEDs (denoted A) is 1:1:2. Here, the number ratios are approximations of luminous flux ratios.

By setting the drive currents of the different color LEDs, and then adjusting the ratios of the overall drive currents of the LED arrays, color rendering index (CRI) for 3200K and 5600K can be obtained. Simulated results are shown in Table 1 below:

TABLE 1

|  | B | Db | G | C | Y | R | O | A | CRI | Lumen |
|---|---|---|---|---|---|---|---|---|---|---|
| 3200K, relative values of drive currents | 1 | 1 | 0.3 | 0.3 | 1 | 0.7 | 0.7 | 1 | 90.7 | 5353 |
|  | 1 | 1 | 0.28 | 0.28 | 1 | 0.7 | 0.7 | 1 | 91.0 | 5371 |
|  | 1 | 1 | 0.28 | 0.28 | 1 | 0.6 | 0.8 | 1 | 90.8 | 5379 |
|  | 1 | 1 | 0.33 | 0.25 | 1 | 0.6 | 0.8 | 1 | 90.9 | 5413 |
|  | 1 | 1 | 1 | 1 | 1 | 1 | 1 | 1 | 73.8 | 6176 |
| 5600K, relative values of drive currents | 1 | 1 | 0.75 | 0.75 | 1 | 0.53 | 0.53 | 1 | 90.5 | 6161 |
|  | 1 | 1 | 0.7 | 0.79 | 1 | 0.53 | 0.53 | 1 | 90.4 | 6147 |
|  | 1 | 1 | 0.78 | 0.7 | 1 | 0.53 | 0.53 | 1 | 90.6 | 6178 |
|  | 1 | 1 | 0.78 | 0.7 | 1 | 0.47 | 0.58 | 1 | 90.7 | 6183 |
|  | 1 | 1 | 1 | 1 | 1 | 1 | 1 | 1 | 79.4 | 6885 |

In Table 1, the drive current for each color LED is expressed as a multiple of its rated drive current. From Table 1, it can be seen that, by setting drive currents for the different color LEDs, and then adjusting the current ratio of the multiple LED arrays, the light emitting device can be made to emit white light of 3200K or 5600K. Moreover, there are multiple sets of drive current parameters for the different color LEDs, and some sets of parameters can achieve color rendering index over 90 for the output light of the light emitting device. The different sets of drive current parameters can achieve output light of different color rendering index and luminous flux for the light emitting device; in practice, the set of drive current parameters can be selected based on need.

Regarding increasing the color rendering index, it is typically believed in conventional technologies that the more kinds of LED spectra that are used, the higher the color rendering index that can be achieved by the overall output light of the light emitting device. However, the more types of LEDs used in the same array, the more complicated the fabrication process of the LED array light source is; and because the drive current of the different color LEDs need to be controlled, current control is also more complex. However, the inventors of this invention discovered that, some color LEDs do not affect the color rendering index much; when some color LEDs are eliminated from the LED arrays, by adjusting the drive currents, the white light output by the light emitting device still has a high color rendering index.

More specifically, when the type of ratio of LEDs in various LED arrays are kept the same as in Table 1, when adjusting the drive current parameters of the different color LEDs in the third LED array 330, the color rendering index and brightness of the output light of the light emitting device are as shown in Table 2. It can be seen from Table 2 that, when the current parameters for the first LED array 310 and the second LED array 320 are kept unchanged, in the case of outputting a 3200K white light, when the drive current of the amber LED (A) becomes lower and lower, the color rendering index and brightness (luminous flux) of the light emitting device both become lower; but when the drive current of the orange LED (O) becomes lower and lower, the color rendering index of the light emitting device is actually higher, but the amount of change is relatively small compared to the amount of change of the drive current. It can be seen that, in the third LED array 330, the amber color LEDs have a larger impact on the color rendering index of the light emitting device, while orange color LEDs (O) have a smaller impact on the color rendering index. Therefore, the third LED array 330 may in fact only include red LEDs and amber LEDs. Through experiments, it was discovered that when the type of LEDs in the first LED array and the second LED array are kept unchanged, by appropriately adjusting the drive currents of such a light emitting device, the color rendering index can still be above 90.

TABLE 2

|  | B | Db | G | C | Y | R | O | A | CRI | Lumen |
|---|---|---|---|---|---|---|---|---|---|---|
| 3200K, relative values of drive currents | 1 | 1 | 1 | 1 | 1 | 1 | 0.5 | 1 | 77.5 | 5080 |
|  | 1 | 1 | 1 | 1 | 1 | 1 | 0.2 | 1 | 80.5 | 5080 |
|  | 1 | 1 | 1 | 1 | 1 | 1 | 1 | 1 | 73.8 | 6176 |
|  | 1 | 1 | 1 | 1 | 1 | 1 | 1 | 0.5 | 62.3 | 5092 |
|  | 1 | 1 | 1 | 1 | 1 | 1 | 1 | 0.2 | 53.3 | 4441 |

Similarly, when the type of ratio of LEDs in various LED arrays are kept unchanged, and adjusting the drive current parameters of the different color LEDs in the second LED array 320, the color rendering index and brightness of the output light of the light emitting device are as shown in Table 3. It can be seen from Table 3 that, when the current parameters for the first LED array 310 and the third LED array 330 are kept unchanged, in the case of outputting a 3200K white light, when the drive current of the yellow phosphor LED (Y) becomes lower and lower, the color rendering index and brightness of the light emitting device both become significantly lower; but when with the drive current of the cyan LED (C) becomes lower and lower, the color rendering index of the light emitting device fluctuates by small amounts but is essentially unchanged. Thus, in the second LED array 320, the yellow phosphor LEDs have a larger impact on the color rendering index of the light emitting device, while cyan color LEDs (C) have a very smaller impact on the color rendering index. Therefore, the second LED array may in fact only include yellow phosphor LEDs and green LEDs when the other LED arrays are unchanged. Through experiments, it was discovered that when the type of LEDs in the first LED array and the third LED array are kept unchanged, by appropriately adjusting the drive currents of such a light emitting device, the color rendering index can still be above 90.

TABLE 3

| | B | Db | G | C | Y | R | O | A | CRI | Lumen |
|---|---|---|---|---|---|---|---|---|---|---|
| 3200K, | 1 | 1 | 1 | 1 | 1 | 1 | 1 | 1 | 73.8 | 6176 |
| relative | 1 | 1 | 1 | 1 | 0.5 | 1 | 1 | 1 | 63.8 | 5904 |
| values | 1 | 1 | 1 | 1 | 0.2 | 1 | 1 | 1 | 53.2 | 4775 |
| of drive | 1 | 1 | 1 | 0.5 | 1 | 1 | 1 | 1 | 79.2 | 6362 |
| currents | 1 | 1 | 1 | 0.2 | 1 | 1 | 1 | 1 | 76.5 | 6280 |

For the first LED array, it was similarly discovered through experiments that when the first LED array only includes blue LEDs, the color rendering index is not significantly changed.

When the first LED array 310 only includes blue LEDs, the second LED array 320 only includes green LEDs and yellow phosphor LEDs, and the third LED array 330 only includes red LEDs and amber LEDs, experiments show that the color rendering index or the light emitting device can still be above 85, which can satisfy the requirements for a light emitting device with a high color rendering index. For example, when the first LED array includes blue LEDs, the second LED array includes yellow phosphor LEDs and green LEDs with a number ratio of 2:1, and the third LED array includes red LEDs and amber LEDs with a number ratio of 1:2, and when the ratio of the relative drive current values of the blue LEDs, green LEDs, yellow phosphor LEDs, red LEDs and amber LEDs is 1:1:1:0.5:1, the color rendering index of the light emitting device after such current adjustment can be as high as 91. After considering the spectral differences of different LEDs of the same kind of colors, the color rendering index of the white light emitted by this light emitting device can still be higher than 85.

Of course, to achieve a particular monochromatic light output or to achieve an even higher color rendering index, the light emitting device can additionally include deep blue LEDs and/or cyan LEDs and/or orange LEDs.

It should be noted that the green LEDs are LEDs coated with green phosphor materials; their dominant wavelength is between 515 nm and 530 nm and they have relatively broad spectrum. When the above experiments were repeated using green phosphor LEDs, it was discovered that green phosphor LEDs can be used to replace the yellow phosphor LEDs in the second LED array, and can meet the requirements of the light emitting device. Therefore, in the light emitting device, green phosphor LEDs can partly or completely replace yellow phosphor LEDs.

Further, amber phosphor LEDs are LEDs coated with amber phosphor materials; their dominant wavelength is between 580 nm and 600 nm and their spectral width is far wider than that of amber LEDs, which is advantageous for increasing the color rendering index of the light emitting device. Therefore, amber phosphor LEDs can be used to replace amber LEDs.

Similarly, red phosphor LEDs are LEDs coated with red phosphor materials; their dominant wavelength is between 620 nm and 640 nm and their spectral width is far wider than that of red LEDs, so red phosphor LEDs can be used to partially or completely replace red LEDs. Cyan phosphor LEDs are LEDs coated with cyan phosphor materials; their dominant wavelength is between 490 nm and 520 nm and their spectral width is far wider than that of cyan LEDs, so cyan phosphor LEDs can be used to partially or completely replace cyan LEDs. Orange phosphor LEDs are LEDs coated with orange phosphor materials; their dominant wavelength is between 610 nm and 620 nm and their spectral width is far wider than that of orange LEDs, so orange phosphor LEDs can be used to partially or completely replace orange LEDs.

Preferably, different color LEDs in the same array should be uniformly distributed in the LED array, to reduce the color shadow effect when the outputted light from such an arrays is projected. This way, as compared to when the same color LEDs are concentrated in the distribution, the color shadows are spread in different areas so that they are less visible.

Figure 6:
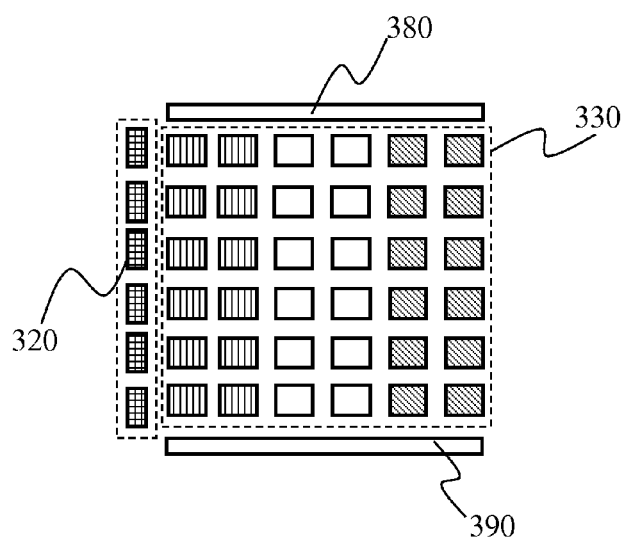
FIG. 6 is a plan view of the light emitting device of FIG. 3.

To reduce light loss, the light emitting device may further include a first reflecting plate and a second reflecting plate. FIG. 6 is a plan view of the light emitting device of FIG. 3. In FIG. 3, the first reflecting plate and second reflecting plate are not shown. By referring to both FIG. 3 and FIG. 6, it can be seen that the first reflecting plate 380 and the second reflecting plate 390 are parallel to the plane defined by the optical axes of the first, second and third LED arrays 310, 320 and 330, for reflecting light incident on the first and second reflecting plates 380 and 390, to reduce light loss due to light exiting the planes of the first and second reflecting plates 380 and 390.

Second Embodiment

Figure 7:
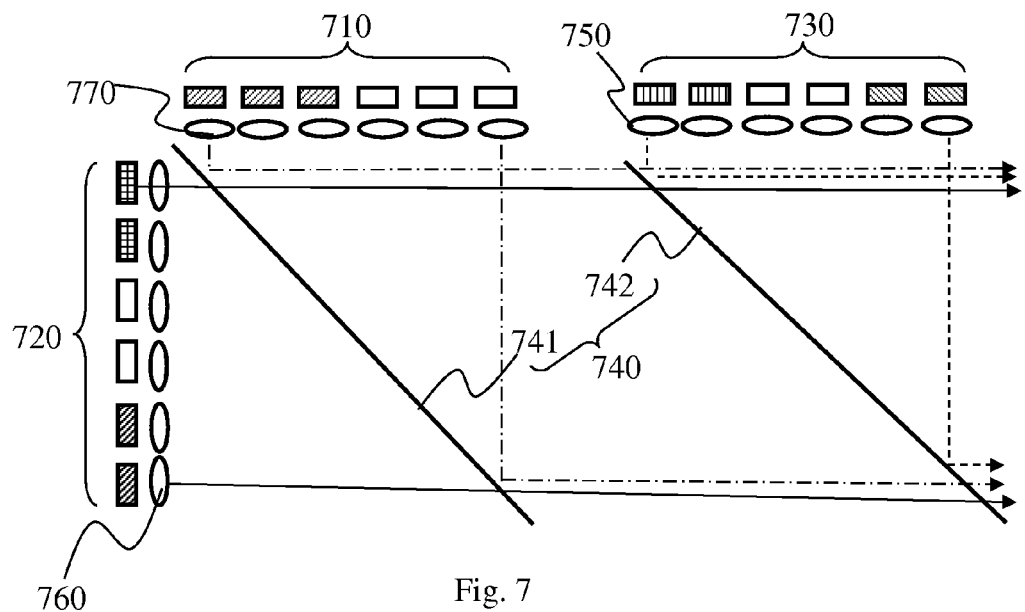
FIG. 7 schematically illustrates the structure of a light emitting device according to another embodiment of the present invention.

In addition to X-shaped filter plates, the wavelength-based light combination device may also be parallel filter plates. FIG. 7 schematically illustrates the structure of a light emitting device according to another embodiment of the present invention. As shown in FIG. 7, the light emitting device includes a first LED array 710, a second LED array 720, a third LED array 730, a wavelength-based light combination device 740, a first collimating lens array 750, a second collimating lens array 760, and a third collimating lens array 770. The wavelength-based light combination device 740 includes first filter plate 741 and second filter plate 742.

Different from the light emitting device of FIG. 3, in this embodiment, the first filter plate 741 and second filter plate 742 are parallel to each other. The first LED array 710 and the second LED array 720 are respectively disposed on two opposite sides of the first filter plate 741. On the surfaces of the first filter plate 741, of the first light emitted by the first LED array 710, the light with wavelength below or equal to the cutoff wavelength $\lambda_1$ is reflected and the rest is transmitted; of the second light emitted by the second LED array 720, the light with wavelength below or equal to the cutoff wavelength $\lambda_1$ is transmitted and the rest is reflected. Thus, the reflected part of the first light and the transmitted part of the second light are combined into one light beam to be output, which is referred to as the first combined light.

Similarly, the third light emitted by the third LED array 730 and the first combined light are respectively incident on two sides of the second filter plate 742. On the surfaces of the second filter plate 742, of the third light emitted by the third LED array 730, the light with wavelength above or equal to the cutoff wavelength $\lambda_2$ is reflected and the rest is transmitted; of the first combined light, the light with wavelength below or equal to the cutoff wavelength $\lambda_2$ is transmitted and the rest is reflected. Thus, the reflected part of the third light and the transmitted part of the first combined light are combined into one light beam to be output. This ultimately achieves the combination of most of the lights emitted by the first, second and third LED arrays 710, 720 and 730.

Third Embodiment

Figure 8:
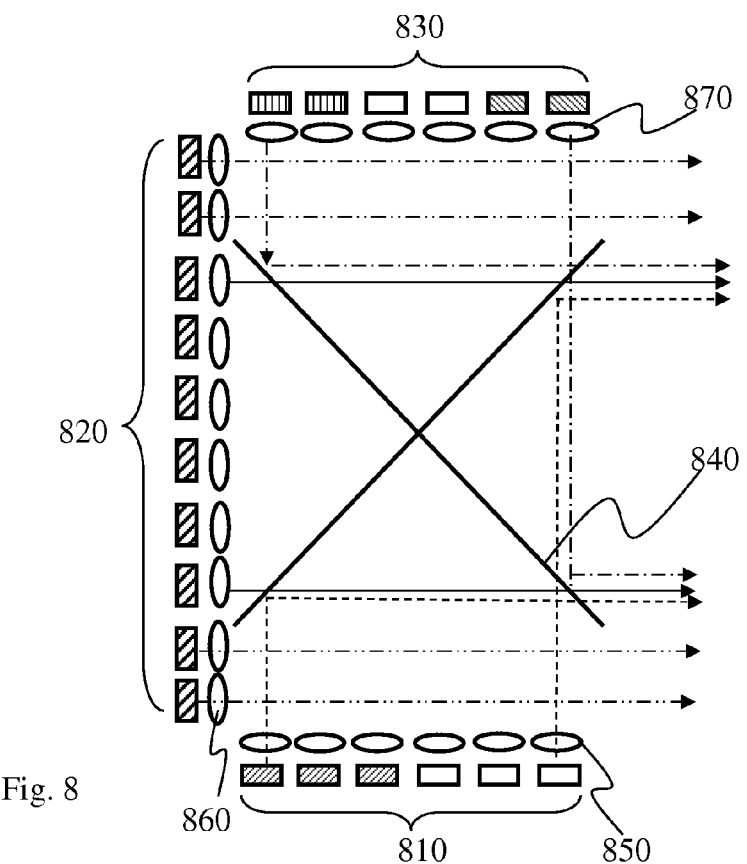
FIG. 8 schematically illustrates the structure of a light emitting device according to another embodiment of the present invention.

For the light emitting device of FIG. 3, in the second LED array 320, a large part of the light emitted by the yellow phosphor LED is filtered out by the wavelength-based light combination device 340, resulting in reduced brightness. Thus, this embodiment provides a new structure to reduce the loss of the light emitted by the yellow phosphor LED. FIG. 8 schematically illustrates the structure of a light emitting device according to another embodiment of the present invention. As shown in FIG. 8, the light emitting device includes a first LED array 810, a second LED array 820, a third LED array 830, a wavelength-based light combination device 840, a first collimating lens array 850, a second collimating lens array 860, and a third collimating lens array 870.

Figure 9:
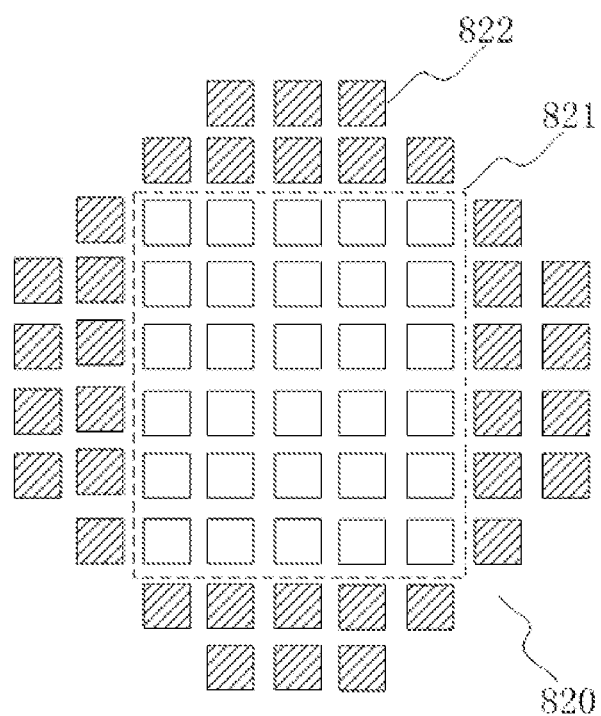
FIG. 9 schematically illustrates a side view of the structure of the second LED array of FIG. 8.

Different from the embodiment of FIG. 3, in this embodiment, the second LED array 820 includes a first array unit 821 and a second array unit 822, the structure of which is shown in FIG. 9. FIG. 9 schematically illustrates a side view of the structure of the second LED array 820 of FIG. 8. As shown in FIG. 9, the LEDs of the second array unit 822 surround the first array unit 821. Specifically, the first array unit 821 includes cyan LEDs and green LEDs, and the second array unit 822 includes yellow phosphor LEDs. The light emitted by the first array unit 821 is incident on the wavelength-based light combination device 840, while the light emitted by the second array unit 822 passes around the outside of the wavelength-based light combination device 840 and is output in the same direction of the output light of the wavelength-based light combination device 840. This way, the second light beam emitted by the second LED array 820 is only partly incident on the wavelength-based light combination device 840. As a result, the yellow light output by the second array unit 822 will not experience a loss.

Of course, it should be understood that in these embodiments and other embodiments of the present invention, the yellow phosphor LEDs in the second LED array may be replaced by other LEDs, such as cyan LEDs, green LEDs, green phosphor LEDs, etc.

Also, as shown in FIG. 9, the LEDs of the second array unit 822 surrounds on the outside of the first array unit 821, and the LEDs of the second LED array 820 approximately forms an octagon shape, so the cross section of the output light of the second LED array 820 is closer to a round shape, which is advantageous for light collection by a lens. In other embodiments of the invention, the LEDs of the second array element 822 can be arranged in other ways, so long as they are arranged outside of the first array unit 821 and the light output from the second array element 822 passes around the wavelength-based light combination device 840. For example, the LED of the second array unit may be arranged on two sides of the first array unit 821.

The various embodiments in this disclosure are described in a progressive manner, where each embodiment is described by emphasizing its differences from other embodiments. The common or similar features of the embodiments can be understood by referring to each other.

Another embodiment of the present invention provides a stage lighting system, including a light emitting device which may have the structure and function as described in the above embodiments.

The above descriptions disclose the embodiments of the present invention, but do not limit the scope of the invention. Thus, it is intended that the present invention cover modifications and variations that come within the scope of the appended claims and their equivalents, as well as direct or indirect applications of the embodiments in other related technical fields.

What is claimed is:

1. A light emitting device, comprising:
   a first light emitting diode (LED) array, including blue LEDs, for emitting a first light;
   a second LED array, including green LEDs and yellow phosphor LEDs, or green LEDs and green phosphor LEDs, for emitting a second light, wherein at least a part of the second light is incident in a wavelength-based light combination device;
   a third LED array, including at least one of red LEDs and red phosphor LEDs, and at least one of amber LEDs and amber phosphor LEDs, for emitting a third light;
   a wavelength-based light combination device, which includes a first filter plate and a second filter plate, wherein the first filter plate has an optical property that reflects light with wavelengths below or equal to $\lambda_1$ and transmits light with wavelengths above $\lambda_1$, the second filter plate has an optical property that transmits light with wavelengths below or equal to $\lambda_2$ and reflects light with wavelengths above $\lambda_2$, where 470 nm $\leq \lambda_1 \leq$ 500 nm and 560 nm $\leq \lambda_2 \leq$ 590 nm;
   wherein the first filter plate receives the first light and the second light which are incident on its different sides, and outputs a reflected part of the first light and a transmitted part of the second light along a first direction; wherein the second filter plate receives the third light and the second light which are incident on its different sides, and outputs a transmitted part of the second light and a reflected part of the third light along the first direction, wherein the first direction is along the direction of the optical axis of the second LED array; and
   a first reflecting plate and second reflecting plate disposed respectively on two sides of the wavelength-based light combination device, wherein the first reflecting plate and the second reflecting plate are parallel to a plane defined by optical axes of the first LED array, the second LED array and the third LED array, for reflecting lights incident on the first and second reflecting plates.

2. The light emitting device of claim 1, wherein all of the second light is incident onto the wavelength-based light combination device.

3. The light emitting device of claim 1, wherein the second LED array includes a first array unit and a second array unit, where the LEDs in the second array unit are located outside of the first array unit, wherein all of a light emitted by the first array unit is incident onto the wavelength-based light combination device, and a light emitted by the second array unit passes around an outside of the wavelength-based light combination device and is output in a same direction as the output light of the wavelength-based light combination device.

4. The light emitting device of claim 3, wherein the second array unit includes yellow phosphor LEDs.

5. The light emitting device of claim 1,
   wherein the first LED array further includes deep blue LEDs; or,
   the second LED array further includes cyan LEDS or cyan phosphor LEDs; or,
   the third LED array further includes orange LEDs or orange phosphor LEDs.

6. The light emitting device of claim 1, wherein the wavelength-based light combination device is X-shaped filter plates.

7. The light emitting device of claim 5, wherein at least one of the LED arrays includes LEDs of more than two colors, and wherein within each of the LED arrays, a luminous flux of LEDs of one color is no greater than three times a luminous flux of LEDs of another color.

8. The light emitting device of claim 5, wherein at least one of the LED arrays includes LEDs of more than two colors, and wherein within the each of the LED arrays, the LEDs of different colors are uniformly distributed in the LED array.

9. The light emitting device of claim 5, wherein the cutoff wavelength $\lambda_1$ of the first filter plate is 490 nm, and the cutoff wavelength $\lambda_2$ of the second filter plate is 580 nm.

10. The light emitting device of claim 5,
wherein the first LED array is formed of deep blue LEDs and blue LEDs;
the second LED array is formed of cyan LEDs, green LEDs, and yellow phosphor LEDs, or formed of cyan LEDs, green LEDs, and green phosphor LEDs; and
the third LED array is formed of orange LEDs, red LEDs, and amber LEDs.

11. The light emitting device of claim 10,
wherein a luminous flux ratio of the blue LEDs and deep blue LEDs in the first LED array is 1:1; a luminous flux ratio of the yellow phosphor LEDs, the green LEDs and the cyan LEDs, or the luminous flux ratio of the green phosphor LEDs, the green LEDs and the cyan LEDs in the second LED array is 2:1:1; a luminous flux ratio of the red LEDs, the orange LEDs and the amber LEDs in the third LED array is 1:1:2.

12. A stage lighting system, comprising a light emitting device of claim 1.

13. A light emitting device, comprising:
a first light emitting diode (LED) array, including deep blue LEDs having a dominant wavelength between 440 nm and 460 nm and blue LEDs having a dominant wavelength between 460 nm and 490 nm, for emitting a first light;
a second LED array, including cyan LEDs having a dominant wavelength between 490 nm and 520 nm, green LEDs having a dominant wavelength between 520 nm and 550 nm, and yellow phosphor LEDs having a dominant wavelength between 540 nm and 570 nm, or including cyan LEDs, green LEDs, and green phosphor LEDs, for emitting a second light, wherein at least a part of the second light is incident in a wavelength-based light combination device;
a third LED array, including orange LEDs having a dominant wavelength between 710 nm and 720 nm, red LEDs having a dominant wavelength between 720 nm and 770 nm, and amber LEDs having a dominant wavelength between 580 nm and 660 nm, for emitting a third light; and
a wavelength-based light combination device, which includes a first filter plate and a second filter plate, wherein the first filter plate has an optical property that reflects light with wavelengths below or equal to $\lambda_1$ and transmits light with wavelengths above $\lambda_1$, the second filter plate has an optical property that transmits light with wavelengths below or equal to $\lambda_2$ and reflects light with wavelengths above $\lambda_2$, where 470 nm $\leq \lambda_1 \leq$ 500 nm and 560 nm $\leq \lambda_2 \leq$ 590 nm;
wherein the first filter plate receives the first light and the second light which are incident on its different sides, and outputs a reflected part of the first light and a transmitted part of the second light along a first direction; wherein the second filter plate receives the third light and the second light which are incident on its different sides, and outputs a transmitted part of the second light and a reflected part of the third light along the first direction, wherein the first direction is along the direction of the optical axis of the second LED array.

14. The light emitting device of claim 13, wherein the cutoff wavelength $\lambda_1$ of the first filter plate is 490 nm, and the cutoff wavelength $\lambda_2$ of the second filter plate is 580 nm.

15. The light emitting device of claim 13,
wherein a luminous flux ratio of the blue LEDs and deep blue LEDs in the first LED array is 1:1; a luminous flux ratio of the yellow phosphor LEDs, the green LEDs and the cyan LEDs, or the luminous flux ratio of the green phosphor LEDs, the green LEDs and the cyan LEDs in the second LED array is 2:1:1; a luminous flux ratio of the red LEDs, the orange LEDs and the amber LEDs in the third LED array is 1:1:2.

* * * * *